(12) United States Patent
Camy-Peyret

(10) Patent No.: US 11,772,335 B2
(45) Date of Patent: Oct. 3, 2023

(54) TORCH AND PLASMA HEATING METHOD FOR PLACING COMPOSITE ROVINGS

(71) Applicant: AKRYVIA, Nantes (FR)

(72) Inventor: Frédéric Camy-Peyret, Nantes (FR)

(73) Assignee: AKRYVIA, Nantes (FR)

( * ) Notice: Subject to any disclaimer, the term of this patent is extended or adjusted under 35 U.S.C. 154(b) by 0 days.

(21) Appl. No.: 17/610,240

(22) PCT Filed: May 12, 2020

(86) PCT No.: PCT/EP2020/063140
§ 371 (c)(1),
(2) Date: Nov. 10, 2021

(87) PCT Pub. No.: WO2020/229449
PCT Pub. Date: Nov. 19, 2020

(65) Prior Publication Data
US 2022/0063215 A1    Mar. 3, 2022

(30) Foreign Application Priority Data

May 16, 2019 (FR) ...................... 19 05118

(51) Int. Cl.
*B29C 70/38* (2006.01)
*B29C 35/06* (2006.01)

(52) U.S. Cl.
CPC ............ *B29C 70/388* (2013.01); *B29C 35/06* (2013.01)

(58) Field of Classification Search
CPC ..... B29C 70/38; B29C 70/382; B29C 70/384; B29C 70/386; B29C 70/388; B29C 35/06
See application file for complete search history.

(56) References Cited

U.S. PATENT DOCUMENTS

| | | | | |
|---|---|---|---|---|
| 4,674,683 A | * | 6/1987 | Fabel | H05H 1/3405 239/81 |
| 5,294,773 A | * | 3/1994 | Lambert | B23K 10/006 219/121.48 |
| 6,451,152 B1 | | 9/2002 | Holmes et al. | |
| 2017/0225413 A1 | | 8/2017 | Larrouy et al. | |
| 2018/0093433 A1 | | 4/2018 | Treiber et al. | |
| 2018/0117851 A1 | | 5/2018 | Reese et al. | |
| 2018/0370152 A1 | | 12/2018 | Horst et al. | |

FOREIGN PATENT DOCUMENTS

| | | | | |
|---|---|---|---|---|
| EP | 557140 B1 | * | 11/1997 | ............ B29C 70/32 |
| FR | 2686080 A1 | | 7/1993 | |
| FR | 3033729 A1 | | 9/2016 | |

OTHER PUBLICATIONS

Translation of EP-557140-B1, Cahuzac G, Nov. 1997 (Year: 1997).*
Anonymous, "Plasma torch," Wikipedia, Jun. 30, 2017, https://we.archive.org/web/20170723101649/https://en.wikipedia.org/wiki/Plasma_torch.

* cited by examiner

*Primary Examiner* — George R Koch
(74) *Attorney, Agent, or Firm* — H&I PARTNERS; C. Andrew Im; Jean-Christophe Hamann

(57) ABSTRACT

A system to place one or more rovings made from composite material on a substrate. The system includes at least a roving-laying head configured to lay at least one roving, an electricity generator and at least one plasma torch. The plasma torch mounted on the roving-laying head and powered by the electricity generator. The plasma torch being further supplied with at least one plasma-forming fluid to generate at least one plasma jet suitable for heating the one or more rovings to be laid on the substrate.

19 Claims, 4 Drawing Sheets

TORCH AND PLASMA HEATING METHOD FOR PLACING COMPOSITE ROVINGS

RELATED APPLICATIONS

This application is a § 371 application of PCT/EP2020/063140 filed May 12, 2020, which claims priority from French Patent Application No. 19 05118 filed May 16, 2019, each of which is incorporated herein by reference in its entirety.

FIELD OF THE INVENTION

The present invention relates to a torch and a plasma heating method for placing composite rovings.

BACKGROUND OF THE INVENTION

Among the technologies for manufacturing parts in composite materials, the placement of rovings, also called fibers, tapes or bands for the widest of them, is an additive technique for laying in an automated manner successive plies of composite material, in which the rovings, having substantially flat sections and formed of a bundle of unit fibers coated with a thermosetting or thermoplastic resin matrix, are laid on the part to be manufactured, which offers a significant flexibility in placing rovings and allows for complex shaped parts with reinforced areas and lightened areas.

Roving placing machines generally consist of a device for setting in relative movement a laying head and a support for the part to be produced, for example a robot on a preform, said preform being also able to be in motion, the assembly being controlled in position and speed by a digital control system.

For example, document US2018/370152 shows an installation for placing composite rovings, which comprises a heating device for the composite rovings during the formation of the composite layer being laid.

The examples of parts produced can be structural parts (wings, fuselages, etc.) or even tanks by filament winding where the laying preform is a rotary mandrel.

The placement of the rovings is generally carried out by means of a laying head providing several main functions:
  supplying and guiding the rovings, typically 1 to 32 rovings and more, having a width of ¼ inch to several inches, generally with the help of a coil magazine, carried or offset, and guiding channels for the rovings,
  cutting the rovings, generally with the help of knives, at the terminal end of the roving guides located as close as possible to the desired laying end location,
  heating the fiber and the substrate in order to bring the materials to the temperature of the assembly process: that of the reaction (generally less than 100° C.) for the thermosetting resin matrices, and that of the melting of the matrix for thermoplastic matrices, up to several hundred degrees for carbon fiber composite materials with PEEK matrix for example,
  applying a compaction force on the hot zone in order to maintain a pressure between the fibers and the substrate, generally by means of a pressure roller rolling on the substrate and crushing the rovings thereon, throughout the welding, consolidation, or solidification time for the joint.

The constraints to which the design of the laying head and its heating system are subjected are the size, the thermal resistance, the maximum weight, the purchase and operating cost, the maintainability, as well as the lifetime.

The main sources of heat used to bring the material of the roving and that of the substrate to the temperature necessary for the placement of composite rovings are:
  convective heating by a directed jet of gas or hot air, as mentioned in document FR3033729,
  radiant heating with the help of radiant sources:
    the laser beam, as described in U.S. Pat. No. 6,451,152, a coherent light of fixed wavelength and of high spatial directivity, pointed towards the heating zone, and generally shaped by means of optics to obtain a laying surface for the heat flux with a height and width precisely adapted to the width of the rovings, as shown in FIG. 2 of this document,
    infrared lamps, which heat by non-coherent radiation—as described in document FR3033729.
  the hybrid heater simultaneously implementing several heat sources described above, as illustrated in document US2018370152, which includes a heating source composed of infrared lamps whose cooling is provided by a gas whose flow is then directed towards the welding area in order to help heat up.

However, the laser sources have the following disadvantages:
  a high investment cost,
  a power limited by the technological difficulties and by the high cost, which de facto limits the productivity of the process, because it is not possible to increase the laying rates, in particular by increasing the speeds or the width or the number of rovings laid simultaneously,
  a poor energy efficiency, of the order of 20 to 45% maximum, which requires large cooling groups, and further increases the cost of purchasing and maintaining the installations, and correspondingly decreases the total energy efficiency after taking into account the electrical consumption of the cooling groups necessary for their use.
  quality problems generated by the differentiated laser-material interaction between the matrix, mostly transparent at the wavelength of the most commonly used lasers (around 1 μm), and the individual fibers, sometimes very absorbent (carbon fibers) for the same wavelength. This differentiated heat absorption leads to hot spots detrimental to the laying quality, and
  a danger due to the laser beam, for which it is required by most regulations to provide the entire machine with a cover, to set up technical and human devices (training and authorization) for access and security control, which result in additional costs for purchase and use.

The disadvantages of other known heat sources are as follows:
  limited heat flows:
    the hot gas flows are limited practically to 1000° C. for electrically heated torches, and to theoretical maximum temperatures of the order of a thousand degrees, for example of the order of 2100° C. maximum (adiabatic flame temperature), for combustion of hydrogen in air. The use of gaseous fuels also has the known drawbacks of managing the risk of explosion or accidental ignition during storage or implementation.
    infrared lamps have a poor energy efficiency, and do not allow high fluxes to be achieved, while occupying a lot of volume in a zone of limited space.
  a low spatial coherence:

the hot gases must be mobilized with a high, turbulent flow, both to transport more heat and increase the convective exchange and therefore have a large energy laying area, infrared lamps radiating in a non-directional manner, they must be installed in the immediate vicinity above the rovings and the substrate, and over long lengths upstream from the point of compaction to achieve the desired temperature rise on both sides.

The consequence of these two intrinsic limitations to heating by convective sources or lamps is that they must be implemented widely upstream of the point of compaction, which unnecessarily uses too much space in the head and is detrimental to energy efficiency.

OBJECT AND SUMMARY OF THE INVENTION

The objective if the invention is to effectively remedy the aforementioned drawbacks by proposing a system for placing one or more rovings of composite material on a substrate, said system comprising at least:

a roving laying head able to lay at least one roving,
an electric generator, and
at least one plasma torch mounted on the roving laying head and supplied with power by the electric generator,
said plasma torch being further supplied with at least one plasma-forming fluid to generate at least one plasma jet suitable for heating the roving(s) to be laid on the substrate.

The advantages of heating by plasma jet are as follows:
the temperatures of the plasma jet can reach 5000° C. to 20,000° C., that is to say a level 5 to 25 times higher than the hot gas, thus allowing an improved heat transfer efficiency compared to all existing devices based on hot gases, the efficiency of a current generator supplying the arc plasma torches reaches 95% to 98%, which makes it possible to at least halve the energy consumption of the source in comparison to the laser, the price of a plasma source is 6 to 10 times lower than an equivalent laser source, the power that a plasma source can deliver can be increased up to several hundred kilowatts and beyond, while the most powerful industrial lasers are currently limited to 25 kW, and already reach prohibitive costs.

Thus, the use of a plasma torch to heat the composite rovings to be laid on the substrate makes it possible to increase productivity while reducing costs.

According to one embodiment of the invention, the plasma jet is operated in a laminar flow regime. This ensures stable heating of the laid roving(s). Indeed, the use of laminar plasma jets makes it possible to overcome the turbulent nature of conventional plasma jet applications which have limited spatial coherence.

According to one embodiment of the invention, the torch comprises a support making it possible to orient the plasma jet(s) towards a contact line, also called the compaction line, between the roving(s) and the substrate in order to heat surfaces of the roving(s) and the substrate proximal to this compaction line.

According to one embodiment of the invention, said system further comprises a pressure roller for crushing the composite roving(s) onto the substrate.

According to one embodiment of the invention, a heat shield is placed between the plasma jet and the pressure roller, or between the composite roving(s) and the pressure roller in order to protect a surface of the pressure roller exposed to a heat flow of the plasma torch from an overheating.

According to one embodiment of the invention, said system further comprises an aeraulic containment screen including two partitions of substantially planar shape placed on either side of the pressure roller.

According to one embodiment of the invention, said roving placing system further comprises a cooling system for the pressure roller including at least one cooling roller made of heat-conducting material, said cooling roller being brought into contact with the pressure roller in order to cool it by conduction.

According to one embodiment of the invention, the electric generator comprises a common primary stage connected to an electrical supply network ensuring at least one AC/DC conversion, and a plurality of individual secondary stages each independently supplying several electrodes of a multiple-jet plasma torch or a plurality of simultaneously operated single-jet plasma torches with a regulated current.

According to one embodiment of the invention, the plasma torch is able to generate at least one gaseous cooling and protecting jet directed towards a periphery of a desired heat laying zone, preferably in a direction substantially parallel to at least one hot plasma jet, said gaseous cooling and protecting jet being preferably operated in a laminar regime, and the gaseous cooling and protecting jet being able to be generated either by a dedicated nozzle or by a plasma nozzle operated at zero or very low power compared to a nominal heating power, for example less than 10% thereof and preferably of the order of 2% to 5% thereof.

According to one embodiment of the invention, the plasma torch comprises nozzles capable of generating, via their outlet orifices, gaseous cooling and protecting jets arranged laterally on either side of a plasma heating jet along an axis parallel to a compaction line.

According to one embodiment of the invention, the outlet orifices of the gaseous cooling and protecting jets preferably have substantially oblong sections with an axis perpendicular to a direction of the outlet orifices of the jets, thus forming a jet of substantially planar shape perpendicular to a compaction line, for example of substantially rectangle or oval outlet sections or a hybridization of these two shapes, or else substantially triangular, the long side or the base of which is arranged parallel to a direction of the roving(s) to be laid.

According to one embodiment of the invention, a fluid for the gaseous cooling and protecting jet(s) consists of compressed air, which is preferably dry and oil-free.

According to one embodiment of the invention, the plasma torch is capable of generating a plurality of plasma jets each having its electric power supply and/or its independently controllable gas flow supply, said plasma jets being preferably arranged substantially in the same plane parallel to a compaction line between the composite roving (s) and the substrate.

According to one embodiment of the invention, said system comprises a regulating system for controlling a plasma-torch heating power comprising one or more devices for measuring a temperature at one or more points of a heating zone on the substrate and/or the roving(s) being laid and a signal of which can be used, directly or after spatial and/or temporal processing, to control a plasma heating power to a set temperature.

According to one embodiment of the invention, a plasma forming fluid consists of an argon-nitrogen mixture, preferably comprising 10% to 50% of argon by volume, preferably 15% to 30% of argon, and ideally approximately 25% of argon and the additional nitrogen.

An object of the invention is also a method for placing one or more rovings of composite material on a substrate implemented by means of a system, as defined above, comprising a step of heating one or more rovings to be laid onto the substrate with the help of at least one plasma jet.

BRIEF DESCRIPTION OF THE DRAWINGS

The present invention will be better understood and other features and advantages will become apparent on reading the following detailed description including embodiments, given as illustrative examples, with reference to the accompanying figures, given as non-limiting examples, which could be used to completely understand the present invention and the description of its implementation and which could contribute, if need be, to its definition, in which.

DETAILED DESCRIPTION OF THE EMBODIMENTS

Figure 1:
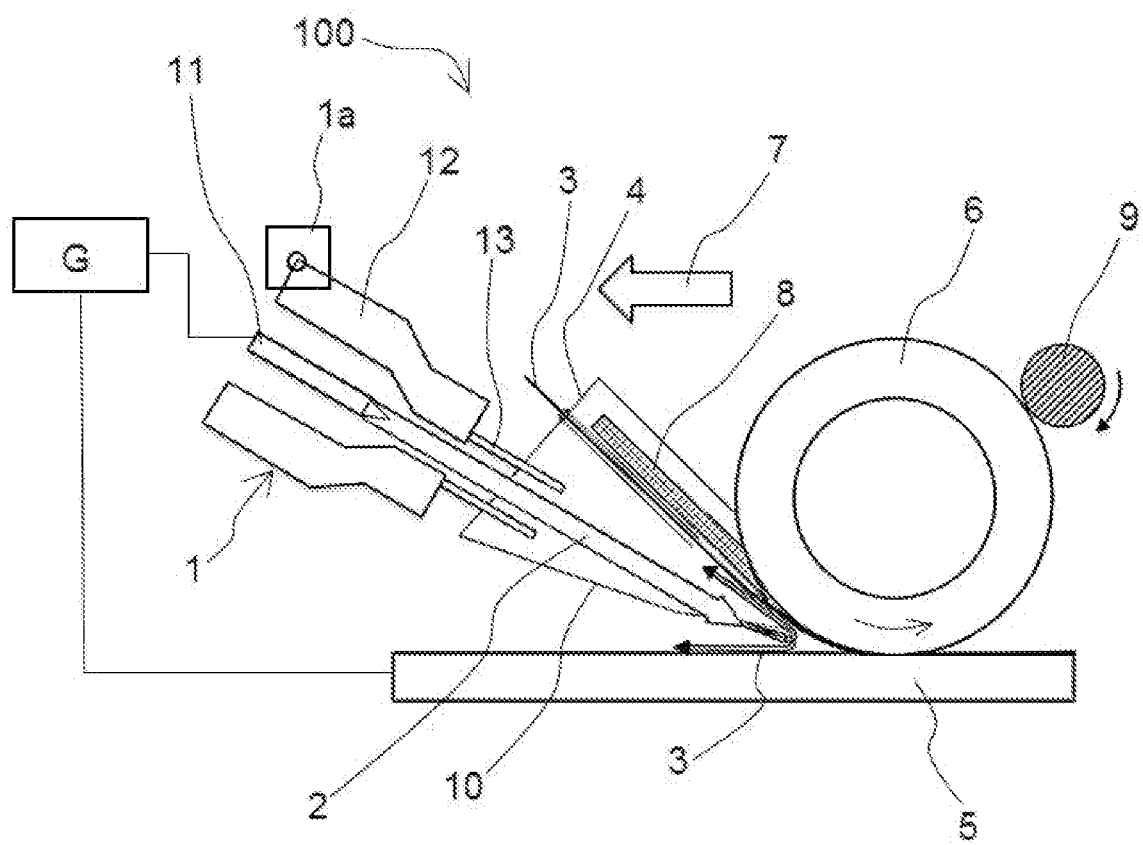
FIG. 1 is a schematic sectional representation along a plane perpendicular to the axis of a pressure roller, of a system for placing one or more rovings of composite material onto a substrate.

FIG. 1 shows a system 100 for placing one or more rovings 3 of composite material onto a substrate 5. The system 100 comprises a plasma torch 1 powered by an electric generator G. The plasma torch 1 is suitable for generating a plasma jet 2, a preferably laminar one, to heat one or more rovings 3 of composite material to be laid onto the substrate 5.

To this end, a roving laying head 4 on which the plasma torch 1 is mounted guides the composite roving(s) 3 onto the substrate 5.

A pressure roller 6 crushes the roving(s) 3 onto the substrate 5. The pressure roller 6 thus applies a compaction force onto the hot zone in order to maintain a pressure between the rovings 3 and the substrate 5 during the displacement of the laying head 4 along the direction of movement having the reference 7.

A heat shield 8 is placed between the plasma jet 2 and the pressure roller 6, or between the rovings and the roller, or parallel to the rovings 3 and as close as possible to the line of contact in the areas without rovings 3, in order to protect the surface of the pressure roller 6, exposed to a heat flow of the plasma torch, from an overheating. This heat shield 8 has for example a width substantially equal to or greater than the width of the roller 6. The heat shield 8 is made for example of refractory material such as metal or a ceramic. The heat shield 8 has, for example, a generally planar or curved shape. The heat shield 8 is cooled for example by natural or forced convection by means of a heat transfer fluid.

A cooling system for the pressure roller 6 comprises at least one cooling roller 9 made of a heat-conducting material, for example a metallic material, such as copper, aluminum or alloys thereof. The cooling roller 9 is brought into contact with the pressure roller 6 in order to cool it by conduction. The cooling roller 9 is optionally cooled by natural or forced convection in connection with a heat transfer fluid, for example by means of internal channels or external fins exposed to the passage of said heat transfer fluid.

An aeraulic containment shield 10 comprises for example two partitions of substantially planar shape placed on either side of the pressure roller. The partitions have for example a shape covering at least one zone starting as close as possible to the compaction line and extending towards the plasma torch 1 in the direction substantially parallel to the jet(s) and of width increasing towards the outlet end of the torch.

More specifically, the blown arc plasma torch 1 comprises at least one electrode 11. The electrode 11 may be constituted in a conventional manner by a pointed electrode made of solid tungsten. As a variant, a tungsten insert may be placed in a flat electrode made of a material which is a good conductor of current and of heat (copper or alloy thereof). Tungsten is preferably thoriated or lanthanated.

At least one nozzle 12 is disposed substantially concentrically with respect to said electrode. The nozzle 12 is terminated by a common nozzle 13.

A primary source of plasma fluid may be constituted, for example, by a gas bottle or a network of compressed gas from air or common industrial gases, preferably argon or nitrogen, preferably an argon-nitrogen mixture, possibly a mixture for starting the plasma (for example pure argon) different from that used during heating in a steady state. The mixture can be carried out upstream at the primary source, in an independent mixer before the torch. The plasma fluid for heating the rovings preferably comprises 10% to 50% of argon by volume, preferably 15% to 30% of argon, and ideally approximately 25% of argon and the complement of nitrogen.

The system 100 also includes elements for supplying, controlling and regulating plasma fluid from the source of the torch and up to the nozzle 12, via a control and regulation system composed for example of a pressure regulator, manual valves or closing and opening controls for the line, pipes and connection fittings, with or without quick connection sockets to ensure injection thereof between the electrode 11 and the nozzle 12. It is possible to provide pressure and flow control means such as discrete or proportional valves, pressure, temperature and/or flow sensors, flow guiding and shaping elements such as perforated or porous diffusers, with or without helical forms of whirling flow generation, or vortex, stabilization of the arc plasma as described in the state of the art of plasma torches, for example thermal spraying or cutting, and providing the plasma jet(s) with a carbon laminar characteristics at the outlet of the torch.

The plasma jet(s) are characterized by the absence of three-dimensional fluctuations in flow velocities and apparent or effective diffusivity coefficients in the flow: turbulent viscosity, turbulent Prandtl and Schmidt numbers equal to their physical values in the plasma fluid at rest at these temperatures.

Supply, control and cooling regulation elements ensure, by contact with a heat transfer fluid such as water or a mixture of water and antifreeze, or a gas such as air or the plasma gas itself, the cooling of the torch 1 and in particular of its elements exposed to the arc plasma such as the nozzle and the electrode, etc.

The electric generator G supplies the plasma with energy, for example by inductive coupling with microwaves or radiofrequencies, but preferably for reasons of energy efficiency by generation of current between the terminals connected to electrode 11, preferably by the negative pole and to the nozzle 12 (or a plurality thereof), preferably by the positive pole between which an electric arc plasma is provided.

The system 100 comprises at least one conventional system for providing an electric arc plasma between the electrode 11 and the nozzle 12, for example but not limited thereto, a high voltage high frequency spark generator or a mechanical system for providing a temporary short-circuit between the electrode and the nozzle.

In addition, the torch 1 comprises a support 1a making it possible to orient the plasma jet(s) 2 towards a contact line (or compaction line) between the roving(s) 3 to be laid and the substrate 5 for heating surfaces of the roving(s) 3 and the substrate 5 near this contact line. This support 1a makes it possible to manually or automatically adjust the relative position of the torch 1 with respect to the application line for the roving, both angularly and in displacement.

The plasma torch 1 may advantageously be equipped with a stepped nozzle system conventionally used in thermal spraying torches, making it possible to first provide the arc between the electrode 11 and a first nozzle stage connected to the generator by a contactor, then to transfer the arc once provided and advected downstream in the nozzle channel to a second nozzle stage also connected to the generator and electrically isolated from the first stage, by opening the contactor of the first stage of the nozzle.

When the width of the single roving 3 to be laid is large, or when several rovings are simultaneously laid by the laying head 4, the present invention also implies that the torch(s) 1 deliver(s) a plurality of round plasma jets, advantageously arranged in the same plane parallel to the compaction line between the roller 6 and the roving(s) 3 and the substrate 5 so as to form a planar plasma jet 2 at the impact site on the material.

When the laying head 4 has multiple rovings 3, the invention implies that at least one plasma jet 2 or a group of plasma jets, the power and plasma gas flow rate of which are regulated independently of the others, are placed opposite each of the rovings 3 so as to be able to control the heating parameters of the roving independently of the others.

The jets with independent current regulation will be supplied either by separate generators, or advantageously by an electric generator G comprising a common primary stage 21, and independent secondary stages 22 respectively generating currents I1, I2, etc. with a common anode back current to the primary stage 21.

More specifically, the electric generator G comprises a common primary stage 21 connected to the power supply network ensuring at least one AC/DC conversion (rectifier unit), and a plurality of individual secondary stages 22 each supplying, with a independently regulated current, several electrodes 11 of a multiple-jet plasma torch 1 or a plurality of single-jet plasma torches 1 operated simultaneously, said electrodes 11 providing arcs forming the plasma jets, a back current being collected at the same common pole of the common primary stage 21 of the electric generator G.

Figure 2:
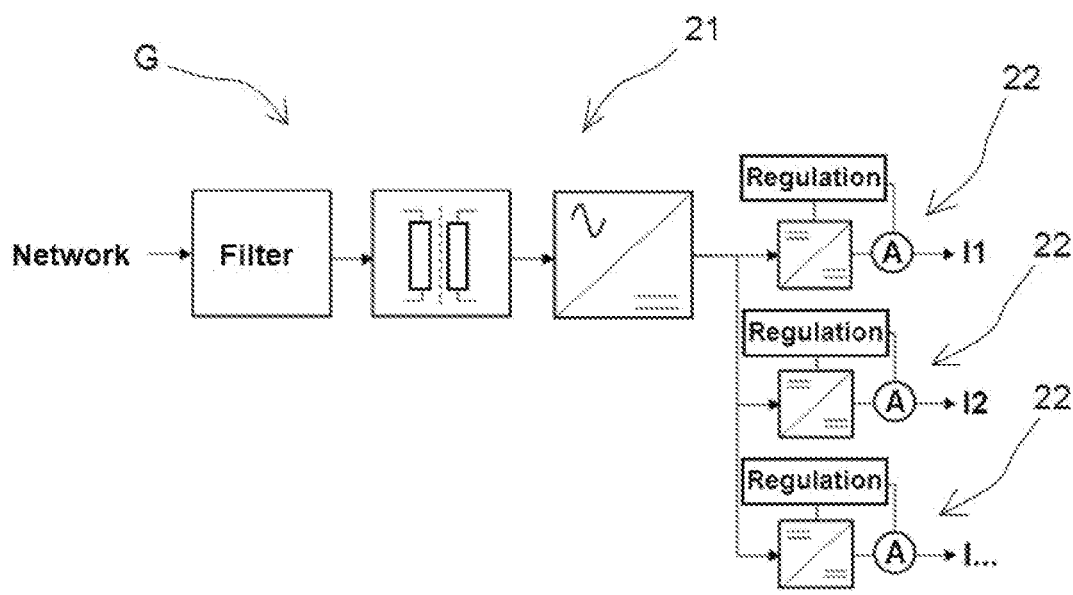
FIG. 2 is a schematic representation of an electric generator comprising secondary stages provided with individual secondary rectifier blocks connected in parallel to the output of a common primary rectifier stage isolated at the input at the frequency of the electric network.

FIG. 2 is a schematic representation of an electric generator G comprising secondary stages 22 provided with individual secondary rectifier blocks connected in parallel to the output of a common primary rectifier stage 21 whose input is isolated at the frequency of the electrical network. The primary stage 21 further comprises an electric filter and a common rectifier.

Figure 3:
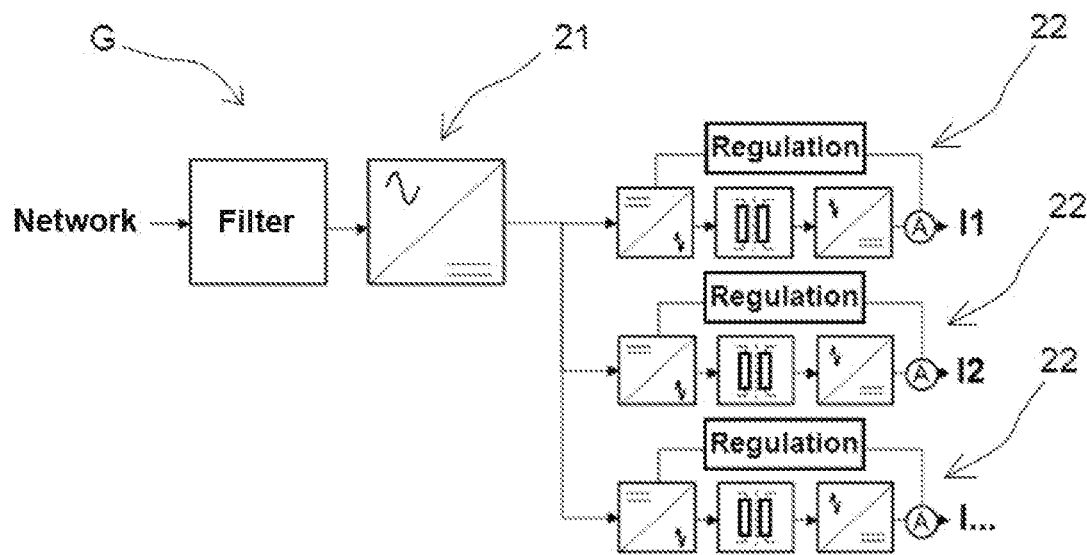
FIG. 3 is a schematic representation of an electric generator comprising secondary stages provided with individual secondary inverter blocks having a high frequency insulation connected in parallel to the output of a primary stage comprising a common rectifier and an electric filter.

FIG. 3 is a schematic representation of an electric generator G comprising secondary stages 22 provided with individual secondary inverter blocks with a high frequency insulation, which are connected in parallel to the output of a primary stage 21 comprising a common rectifier and an electric filter.

Figure 4:
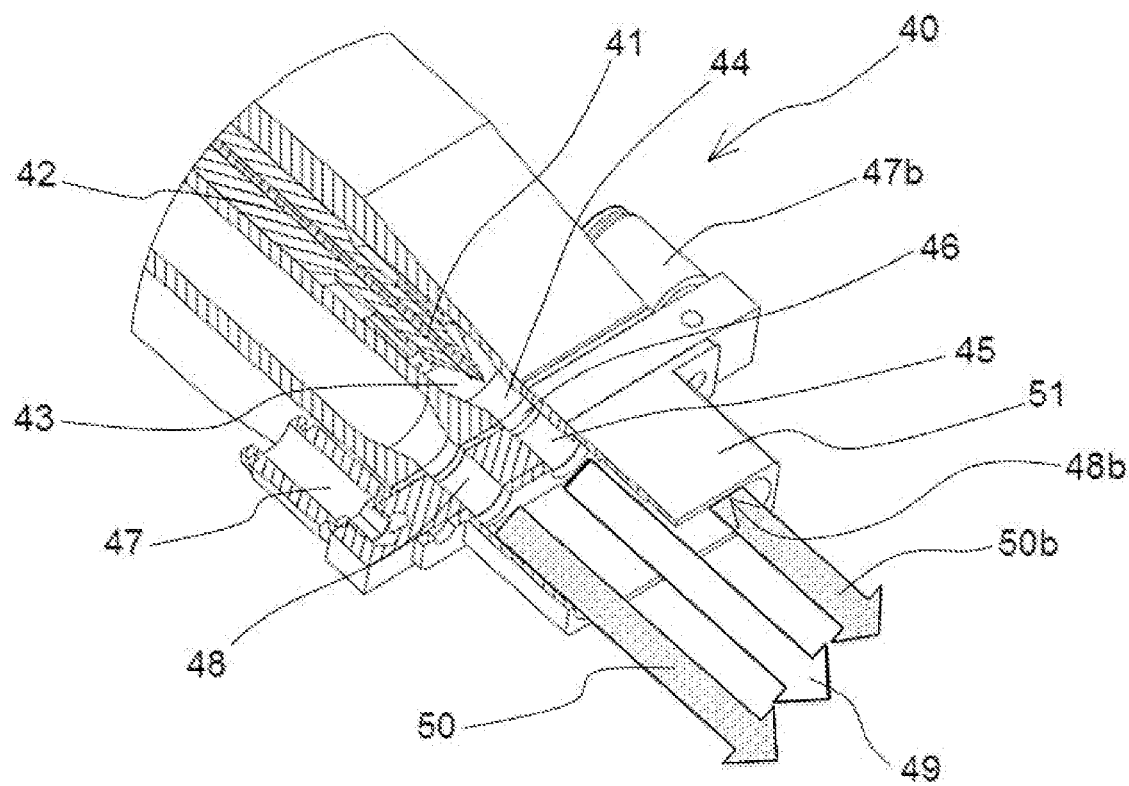
FIG. 4 shows a single-jet plasma torch with two cooling jets and a common protecting nozzle.

FIG. 4 shows for example a single-plasma jet torch 40 with two cooling jets and a common protective nozzle. The single plasma jet torch 40 comprises an electrode 41 having a substantially conical end made of tungsten. An electrode holder 42 made of a conductive material is connected to the negative pole of the direct current generator (not shown). A homogenization and laminarization diffuser 43 is made of an insulating material, for example a thermoplastic or thermosetting material or a ceramic or mineral material. A priming nozzle 44 made of a conductive material is connected to the positive pole of the generator via a power contactor which can be actuated under load. The priming nozzle is preferably cooled by a cooling liquid with high heat transfer power, such as water or oil, circulating in channels (not shown).

A heating nozzle 45 is made of a conductive material, in particular of copper or of a copper alloy. The heating nozzle 45 is connected to the positive pole of the current generator. The heating nozzle 45 is cooled by a cooling liquid, such as water or oil, circulating in channels (not shown). The torch 40 further comprises an insulating insert 46 preferably made of ceramic or of a refractory mineral material.

Supply 47 and return 47b connectors for cooling water are connected to a cooling circuit. Left 48 and right 48b cooling and protection nozzles (not visible) are arranged on either side of the heating nozzle 45. The left 50 and right 50b gaseous cooling and protection jets are thus arranged on either sides of the plasma heating jet 49.

A common protection nozzle 51 surrounds the plasma heating jet 49 and the cooling and protection jets 50, 50b. The common nozzle 51 extends from the most downstream jet outlet section over a length ensuring that the coalescing flow is directed towards the exterior of the torch (downstream) at any point in the outlet section of said common protective nozzle, that is to say without recirculation of ambient air towards the interior of the nozzle, with a ratio of said length to the minimum dimension of the outlet section of said nozzle greater than 1, preferably greater than 2, and ideally between 3 and 5.

The laminar cooling and protection jets 50, 50b have the function of reducing the collateral heat flow in the direction transverse to the band to be laid. The jets 50, 50b are generated by the nozzles 48, 48b, the orifices of which are placed on either side of that of the plasma heating nozzle 49. The jets 50, 50b have a direction substantially parallel to the plasma jet and are directed onto the two areas collateral to the bonding area of the composite band.

The jets 50, 50b make it possible to avoid the deflection and the coalescence of the plasma jets, for example the side jet in the event of multiple plasma jets, or adjacent jets in the event of extinction of one of the plasma jets of the torch when the roving facing it is not being laid.

The jets 50, 50b also make it possible to protect the heating and cooling jets from the entrainment of oxidizing ambient air within them and thus to maintain the heating zone under protection in an inert atmosphere, for example of nitrogen or argon.

FIG. 4 shows an exemplary embodiment of the invention with a laminar plasma single jet and two lateral cooling and protective jets 50, 50b which can be used for example on a single-roving laying head for a filament winding machine using rovings of a quarter of an inch (6.35 mm) or a half inch (12.7 mm) in width, with an electrode of 1.6 to 2.4 mm in diameter, a nozzle with an outlet section of 3 to 8 mm in diameter and an arc intensity of 20 to 200 A.

A cooling jet 50, 50b is preferably operated in a laminar regime. A cooling jet 50, 50b can be generated either by one or more dedicated nozzles as illustrated in FIG. 4, or by a plasma nozzle operated at zero or very low power compared to the nominal heating power, for example lower 10% thereof and preferably of the order of 2% to 5% thereof.

A cooling jet 50, 50b can be regulated so that the average output speed of the fluid for these cooling jets is set at a value such that the average dynamic pressure $(\frac{1}{2}\rho V^2)_{cold}$ in the cooling jet is substantially equal to the average dynamic pressure $(\frac{1}{2}\rho V^2)_{hot}$ of the adjacent (hot) plasma jet(s).

The fluid for the cooling jet(s) 50, 50b for example consists of compressed air, preferably dry and oil-free.

Figure 5:
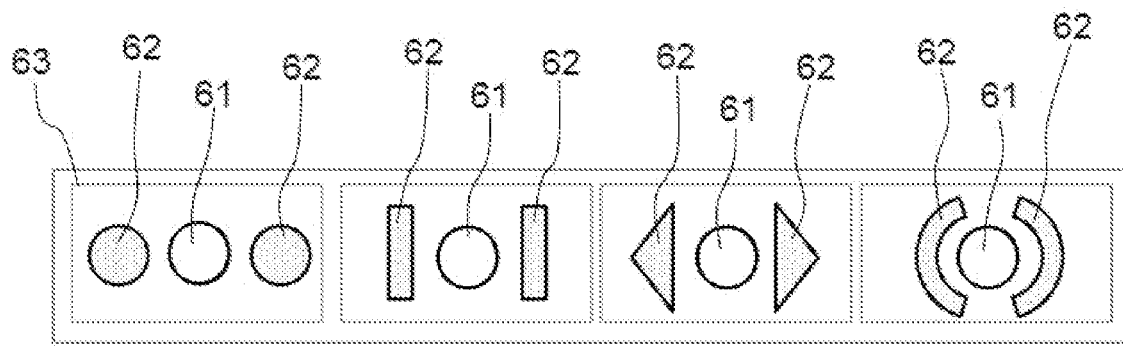
FIG. 5 shows examples of topologies of the output sections on the front face of a single plasma jet torch.

FIG. 5 shows examples of topologies of the output sections on the front face of a plasma single-jet torch. In this figure, the reference of the outlet section of the nozzle forming the plasma jet is 61. The reference of the outlet sections of the nozzles forming the cooling and protection jets is 62.

The reference of the contour of the end face of the torch is 63.

Thus, the outlets of the nozzles forming the cooling and protection jets can have sections 62 of the:

circular, rectangular, triangular type on either side of the outlet of the nozzle forming the plasma jet, or circular-arc type substantially surrounding the outlet of the nozzle forming the plasma jet.

The outlet orifices for the cooling jets preferably have substantially oblong sections 62 with an axis perpendicular to the direction of the outlet orifices for the jets, thus forming a jet of substantially planar shape perpendicular to the compaction line, for example of substantially rectangular or oval outlet sections or a hybridization of these two shapes, or else of substantially triangular shape the long side or the base of which is arranged parallel to the direction of the rovings to be laid.

Figure 6:
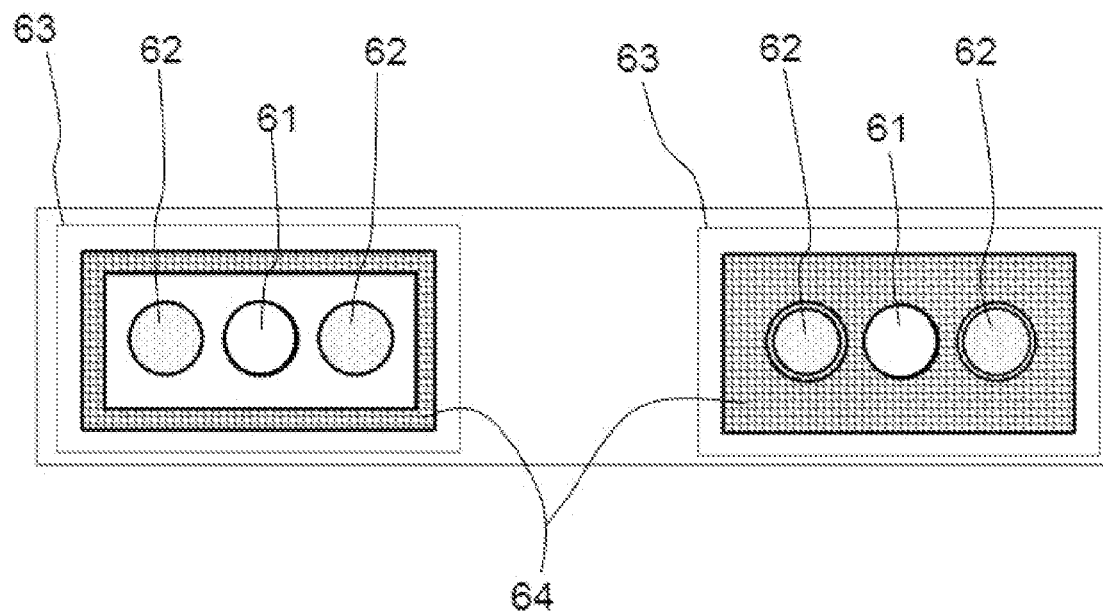
FIG. 6 shows examples of topology of the output sections on the front face of a single-jet plasma torch with separate cooling and protecting nozzles.

FIG. 6 shows examples of the topology of the output sections on the front face of a single plasma jet torch with separate cooling and protecting nozzles.

In this figure, the reference of the outlet section of the nozzle forming the plasma jet is 61. The reference of the outlet sections of the nozzle(s) forming the cooling and protecting jets is 62. The reference of the contour of the end face of the torch is 63. The reference of the outlet section of the nozzle(s) forming the gas protection flow is 64.

In the embodiments of FIG. 6, the cooling and protecting jets 62, whose dynamic pressure (speed) is close to plasma jets, are completed by an injection nozzle 64 of a laminar gaseous protection flow, with a lower speed for guaranteeing the protection of the jets and the heating zone with an inert atmosphere.

The gaseous protection nozzle(s) 64 can either surround all the outlet sections of the nozzles forming the plasma jet 61 and the cooling and protecting jets 62 (left-hand embodiment in FIG. 6), or individually surround the outlet sections of the nozzles forming the plasma jet 61 and forming the cooling and protecting jets 62.

A variant of the invention consists of the use of a common nozzle or of a common protection nozzle as shown with reference 51 in FIG. 4. This common nozzle makes it possible to isolate the plasma jets and cooling and protecting jets for the ambient air outside the torch 61. Thus, the entrainment of ambient air by the jets at the outlet of the torch 61 is greatly reduced or eliminated.

The plasma torch can form a plurality of plasma jets, each with its own electric power supply (by one or more electric generators) and/or its own independently controllable gas flow supply, said plasma jets being preferably arranged substantially in the same plane parallel to the line of contact between the composite roving to be laid and the substrate.

The plasma jets or group of plasma jets of the plurality of plasma jets can be positioned substantially opposite the supplying guide for each roving (fiber/band) of composite of the laying head.

Figure 7:
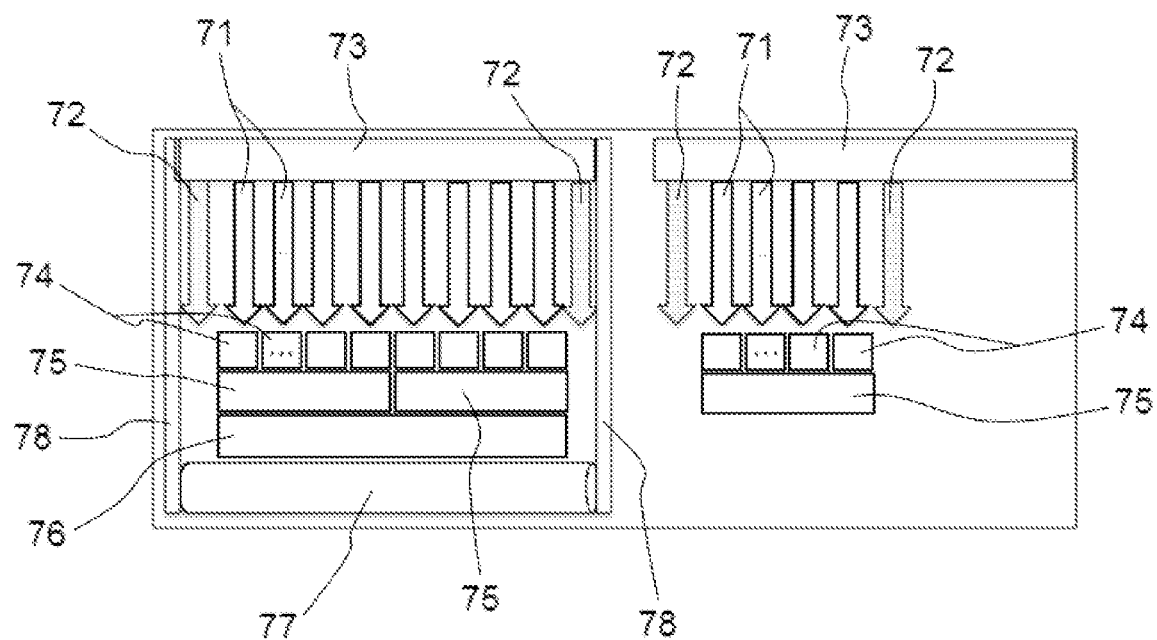
FIG. 7 shows two variants of multi-jet torches or plasma torch with multiple laminar jets.

FIG. 7 shows two variants of multi jet torches or plasma torch with multiple laminar jets. In the first variant shown in the part on the left in FIG. 7 is shown a torch 73 with 8 plasma jets 71 and two cooling jets 72 arranged in a parallel plane and facing, in the operating mode on the left, eight rovings 74, for example of a quarter of an inch in width (6.35 mm), two rovings 75 for example of one inch (25.4 mm) in width or a band 76 for example of two inches in width. It will be understood that a band 76 is a composite roving of width grade.

The typical diameter of the generating nozzles of the laminar plasma jets is in this example of 3 mm, regularly spaced with the width of the bands (6.35 mm), or slightly more in the case of space between each roving 74, for tungsten electrodes of 1.6 mm in diameter, each operated with continuously variable currents between 10 and 110 amperes.

This arrangement further comprises side cooling jets 72 projected on either side of the plasma jets 71. The side jets 72 have a dynamic pressure substantially equal to the dynamic pressure of the adjacent plasma jet which eliminates the deflection of the plasma jet towards the interior of the torch by suction (Venturi effect) linked to the dynamic depression induced by the central jets. During the impact of the planar jet thus formed on the compaction line at the bottom of the dihedron, the side jets 72 ensure that the plasma jets 71 are deflected parallel to the roving(s) and in advance, i.e. they will continue to heat the substrate and the roving(s) in the desired direction, and will not be deflected laterally to either side along the compaction line.

This effect is reinforced by the implementation of walls 78 with high thermal resistance, for example out of ceramic preventing the lateral deflection of the planar jet on either side of the roller 77.

In the second variant shown in the part on the right in FIG. 7 is shown the previous plasma jet torch 73 for which the head is for example operated with a partial laying of rovings 74, 75, for example half of the rovings 74, 75 or one of the two roving 74, 75, the nozzles adjacent to the plasma jets are operated with a zero or minimum power, generating thereby a cooling jet providing the same functions as the side cooling jets 72.

Figure 8:
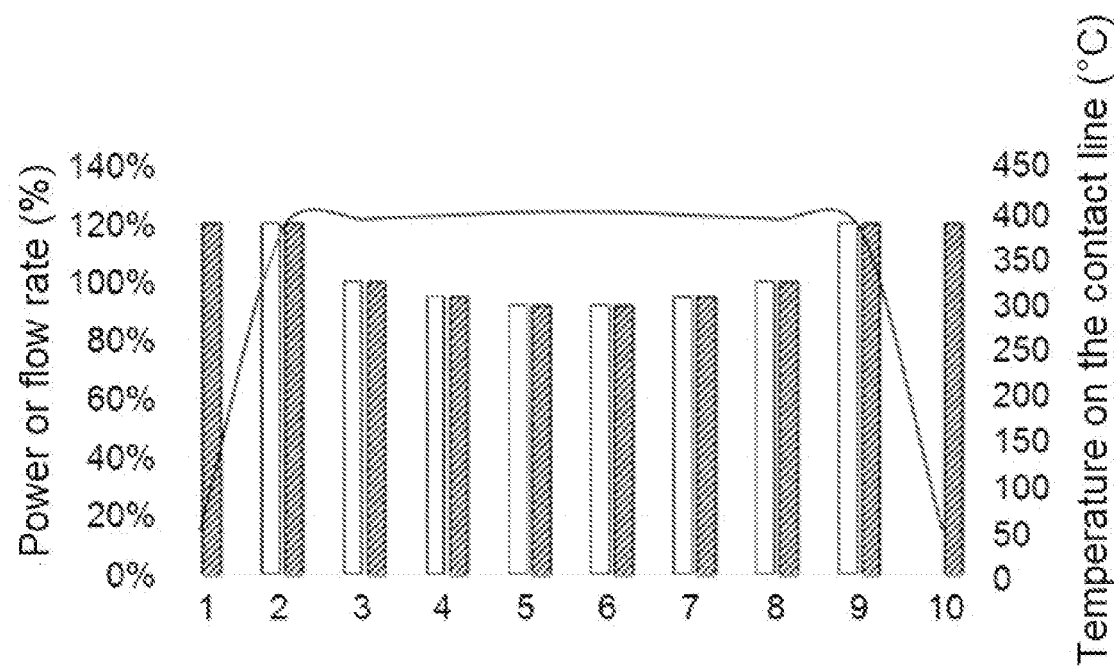
FIG. 8 shows an example of electrical power profiles for controlling plasma jets and flow rate of the plasma jets of the multi jet plasma torch of the first embodiment of FIG. 7.

FIG. 8 shows an example of electrical power profiles for controlling the plasma jets and the flow rate of the plasma jets of the multi jet plasma torch of the first previous variant (part on the left in FIG. 7) with the vertical bars of indices 2 to 9, and the flow rates of the cooling jets with indices 1 and 10.

In addition, the continuous line curve in this figure represents a measurement of the temperature on the contact line along this line.

Thus, the electrical power profiles for controlling the plasma jets and the flow rate for the plasma jets of the plasma torch 1 are adapted and predetermined experimentally once and for all or adapted by real-time regulation based on at least one measurement of temperatures along the contact line. Advantageously, these adaptations are carried out with the aim of obtaining a substantially flat or constant temperature profile along the contact line. Optionally, a particular temperature profile can be determined, for example depending on the material(s) of the rovings (if rovings of various materials are used) or depending on the substrate, or depending on desired product characteristics, or roving advance speed of any other parameter.

The temperature measurement(s) along the contact line can be carried out for example by any non-contact temperature measurement sensor, such as a laser sensor, or a pyrometer, or a thermal camera (e.g. infrared camera).

Thus, it is possible to use a regulation system for controlling the heating power per plasma torch comprising one or more temperature measuring devices at one or more points of the heating zone on the substrate and/or the roving(s) being laid and the signal of which is used, directly or after spatial and/or temporal processing, to control the plasma heating power to a set temperature. The power of the torch can then be controlled by regulating the current of the electric generator the plasma torch is supplied with, said current tending to be increased when the measured temperature is lower than the set temperature, and said current tending to be reduced otherwise.

The previous heating power regulation system may include a coupled regulation of the current and the flow rate of plasma forming gas supplying the torch or the jets, the control logic of which is based on measuring signals for the arc voltage at the terminals of the torch, said flow rate being limited so that the arc voltage does not exceed a predetermined threshold depending on the intensity.

The nozzle of the plasma jet or part of the nozzle for generating the plasma jets can be regulated independently in current on respective electrode circuits, and this nozzle for the plasma jet performs the role of common collecting anode for the current for all plasma jets.

The method of placing one or more rovings of composite material on a substrate may comprise a mode of individual regulation of the power of the plasma jet(s) of the plasma torch. The mode of regulation is advantageously of the "pilot" type, triggered by a discrete set point, in which the heating power is reduced to a minimum, making it possible to ensure the stable maintenance of the electric arc plasma by regulating the current to its technical minimum, and the flow rate to its minimum technical, an operating mode preferentially triggered during the phases of transfer of the head from one point to another of the part without any laying process, or when the band located in front of the plasma jet is not laid.

As a variant, a mode of individual power regulation of the plasma jet(s) of the plasma torch is of the "cold jet" type triggered by a discrete activation instruction, i.e. ON/OFF, in which the heating power is reduced to zero, and the flow rate is regulated to a non-zero value, an operating mode preferentially triggered during the phases of transfer of the head from one point to another of the part without any laying process, or when the band located in front of the plasma jet is not laid, and ideally triggered after an operating mode of reduced power for a period which exceeds a set period.

Of course the different features, variants and/or embodiments of the present invention can be associated with one another in various combinations insofar as they are not incompatible or exclusive with one another.

Obviously, the invention is not limited to the embodiments described above and provided by way of example only. It encompasses various modifications, alternative forms and other variants a person skilled in the art may consider in the context of the present invention and in particular any combination of the various operating modes described above, which may be taken separately or in combination.

The invention claimed is:

1. A system to place one or more rovings of a composite material on a substrate, comprising:
   a roving laying head configured to lay at least one roving;
   an electric generator;
   at least one plasma torch mounted on the roving laying head and supplied with power by the electric generator; and
   said at least one plasma torch being further supplied with at least one plasma forming fluid to generate at least one plasma jet to heat said at least one roving to be laid on the substrate;
   wherein said at least one plasma torch is configured to generate at least one gaseous cooling and protecting jet directed towards a periphery of a desired heat laying zone, in a direction parallel to said at least one plasma jet, said at least one gaseous cooling and protecting jet being operated in a laminar regime, and said at least one gaseous cooling and protecting jet being generated either by a dedicated nozzle or a plasma nozzle operating at zero or less than 10% of a nominal heating power,
   wherein said at least one plasma jet and said at least one gaseous cooling and protecting jet are distinct outputs of the plasma torch.

2. The system of claim 1, wherein said at least one plasma jet is operated in a laminar flow regime.

3. The system of claim 1, wherein said at least one plasma torch comprises a support configured to orient said at least one plasma jet towards a compaction line, between said at least one roving and the substrate, to heat surfaces of said at least one roving and the substrate proximal to the compaction line.

4. The system of claim 1, further comprising a pressure roller to crush said at least one roving onto the substrate.

5. The system of claim 4, further comprising a heat shield placed between said at least one plasma jet and the pressure roller, or between said at least one roving and the pressure roller to protect a surface of the pressure roller, exposed to a heat flow from said at least one plasma torch, from overheating.

6. The system of claim 4, further comprising an aeraulic containment screen comprising two partitions of a planar shape placed on either side of the pressure roller.

7. The system of claim 4, further comprising a cooling system comprising at least one cooling roller made of a heat-conducting material to cool the pressure roller by conduction.

8. The system of claim 1, wherein said at least one plasma torch is a multiple-jet plasma torch; and wherein the electric generator comprises a common primary stage connected to an electrical supply network ensuring at least one AC/DC conversion, and a plurality of individual secondary stages, each individual secondary stage independently supplying several electrodes of the multiple-jet plasma torch with a regulated current.

9. The system of claim 1, wherein said at least one plasma torch comprises a plurality of simultaneously operated single-jet plasma torches; and wherein the electric generator comprises a common primary stage connected to an electrical supply network ensuring at least one AC/DC conversion, and a plurality of individual secondary stages, each individual secondary stage independently supplying several electrodes of said plurality of simultaneously operated single-jet plasma torches with a regulated current.

10. The system of claim 1, wherein said dedicated nozzle or said plasma nozzle operating at 2% to 5% of the nominal heating power.

11. The system of claim 1, wherein said at least one plasma torch and said dedicated nozzle comprises dedicated nozzles configured to generate, via outlet orifices, said at least one gaseous cooling and protecting jet as gaseous cooling and protecting jets arranged laterally on either side of said at least one plasma jet along an axis parallel to a compaction line.

12. The system of claim 11, wherein the outlet orifices comprise oblong sections with an axis perpendicular to a direction of the outlet orifices, thus forming a jet of a planar shape perpendicular to a compaction line.

13. The system of claim 11, wherein the outlet orifices comprise rectangle sections, oval outlet sections, a hybridization of rectangle and oval shapes, or triangular sections with long sides or bases arranged parallel to a direction of said at least roving to be laid.

14. The system of claim 1, wherein a fluid for said at least one gaseous cooling and protecting jet comprises a compressed air, which is dry and oil-free.

15. The system of claim 1, wherein said at least one plasma torch is configured to generate a plurality of plasma jets, each plasma jet having at least one of an electric power supply and an independently controllable gas flow supply, said each plasma jet being arranged in a same plane parallel to a compaction line between said at least one roving and the substrate.

16. The system of claim 1, further comprising a regulating system to control a plasma-torch heating power, the regulating system comprising one or more temperature sensors to measure a temperature at one or more points of a heating zone on at least one of the substrate and said at least one roving being laid; and wherein the temperature measure is used, directly or after at least one of a spatial and a temporal processing, to control the plasma-torch heating power to a set temperature.

17. The system of claim 1, wherein said at least one plasma forming fluid comprises an argon-nitrogen mixture comprising 10% to 50% of argon by volume.

18. The system of claim 17, wherein the argon-nitrogen mixture comprises 15% to 30% of argon.

19. A method for placing one or more rovings of a composite material on a substrate implemented by the system of claim 17, comprising heating said one or more rovings to be laid onto the substrate with said at least one plasma jet.

* * * * *